United States Patent
Takahashi et al.

(10) Patent No.: US 6,622,685 B2
(45) Date of Patent: Sep. 23, 2003

(54) PRESPRAY PROCESSED CYLINDER INSIDE AND CYLINDER INSIDE PRESPRAY PROCESSING METHOD

(75) Inventors: Hideo Takahashi, Kanagawa-ken (JP); Minoru Chuubachi, Kanagawa-ken (JP); Kiyoshi Hasegawa, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/181,052

(22) PCT Filed: Nov. 13, 2001

(86) PCT No.: PCT/JP01/09916
§ 371 (c)(1),
(2), (4) Date: Jul. 12, 2002

(87) PCT Pub. No.: WO02/40850
PCT Pub. Date: May 23, 2002

(65) Prior Publication Data
US 2003/0010201 A1 Jan. 16, 2003

(30) Foreign Application Priority Data
Nov. 16, 2000 (JP) .................................. P2000-350056

(51) Int. Cl.[7] .............................. F02F 1/00; F16J 1/00; F02B 77/02; C23C 4/02
(52) U.S. Cl. .................................................... 123/193.2
(58) Field of Search ...................... 123/193.2; 29/888.06, 29/888.061; 451/408, 14, 26, 123

(56) References Cited

U.S. PATENT DOCUMENTS

| 2,314,902 | A |   | 3/1943  | Shepard         |         |
|-----------|---|---|---------|-----------------|---------|
| 3,808,955 | A | * | 5/1974  | Hamada et al.   | 123/193.2 |
| 4,706,417 | A | * | 11/1987 | Gary            | 123/193.2 |
| 5,363,821 | A | * | 11/1994 | Rao et al.      | 123/193.2 |
| 5,549,086 | A | * | 8/1996  | Ozawa et al.    | 123/193.2 |
| 5,691,004 | A |   | 11/1997 | Palazzolo et al.|         |
| 6,095,107 | A | * | 8/2000  | Kloft et al.    | 123/193.2 |
| 6,244,934 | B1|   | 6/2001  | Miyai et al.    |         |

FOREIGN PATENT DOCUMENTS

| GB | 408 067    | 4/1934  |
| GB | 1 015 036  | 12/1965 |
| JP | 11-320414  | 11/1999 |

* cited by examiner

*Primary Examiner*—Marguerite McMahon
(74) *Attorney, Agent, or Firm*—Foley & Lardner

(57) ABSTRACT

A cylindrical surface (3) is roughed to be prepared for a spray film (11) to be formed thereon, by cutting therein rough undulations (21) in a threaded form, using a cut chip (20) leaving a groove part (21*a*) of a respective undulation (21) in a preset direction or cut form, for breaking or partially tearing off a ridge part (21*b*) of the rough undulation (21) to have a remainder of the ridge part (21*b*) formed with finer undulations (22).

8 Claims, 5 Drawing Sheets

PRESPRAY PROCESSED CYLINDER INSIDE AND CYLINDER INSIDE PRESPRAY PROCESSING METHOD

TECHNICAL FIELD

The present invention relates to a prespray processed cylinder inside and a cylinder inside prespray processing method for preparing the surface of a cylinder inside to be roughed for a spray film to be formed thereon.

BACKGROUND ART

As a preliminary process for formation of a spray film to a cylinder inside or bore of a liner-less aluminum cylinder block that is advantageous for weight reduction and exhaust processing of an automobile engine, a roughing to the cylinder inside is needed to achieve an enhanced adhesion of the spray film. There is disclosed a blasting as a roughing method in Japanese Patent Application Laying-Open Publication No. 11-320414.

DISCLOSURE OF INVENTION

The blasting employs an abrasive material, which is abrasive in repeated use, causing the surface condition of blasted cylinder inside to be varied, resulting in a bad subsequent influence on the adhesion strength of spray film.

A blast gun is vertically moved and rotated for the blasting, needing a masking material for preventing a collision of abrasive material to a crankshaft bearing surface or a mating surface of the cylinder head, resulting in an enlarged scale and complexity of an entire installation.

The abrasive material and masking material are consumed, accompanying scattered powder dust, with a bad influence on the working environment, and those consumables in use causes an increased cost and replacement work, leading to a reduced productivity.

It is an object of the present invention to form a rough surface allowing for a spray film on a cylinder inside to have an enhanced adhesion strength, possibly avoiding accompanying an enlarged scale or complexity of an entire installation nor leading to a bad working environment or reduced productivity.

To achieve the object, according to an aspect of the present invention, there is provided a prespray processed cylinder inside comprising a cylindrical surface prepared for a spray film to be formed thereon and roughed with a set of first undulations cut therein in a threaded form, including a subset thereof having ridge parts of first undulations thereof broken and formed with a set of second undulations finer in undulation width than a first undulation.

According to another aspect of the present invention, there is provided a cylinder inside prespray processing method comprising preparing a cylindrical surface for a spray film to be formed thereon, roughing the cylindrical surface by cutting therein a set of first undulations in a threaded form, having ridge parts of first undulations of a subset thereof broken and formed with a set of second undulations finer in undulation width than a first undulation.

According to these aspects of the invention, a cylindrical surface has a set of first undulations cut therein in a threaded form, of which a subset has first undulations thereof, which have their ridge parts (that may be original surface parts left between cut grooves), which ridge parts are broken and have their broken surfaces, of which an entirety is defined by a set of second undulations, so that a respective broken surface at the ridge part of a corresponding first undulation is defined by a corresponding subset of the set of second undulations. Any second undulation in the corresponding subset of second undulations is finer in undulation width than the corresponding first undulation.

Accordingly, the cut cylindrical surface, which is configured in a threaded form with first undulations that have their groove parts and their ridge parts with broken surfaces defined by fine second undulations, allows a spray film to intrude into the groove parts and onto the broken surfaces, resulting in an enhanced adhesion strength, in particular, at the fine second undulations.

It is noted that, when cutting a surface by a cutting tool, the way or direction for cut chips to leave can be set. The ridge part of a first undulation may preferably be broken or torn by a cut chip leaving a cut groove part of the first undulation, in a preset direction or in a preset cut form. In this case, the blasting process may not be used for roughing a cylinder inside, successfully avoiding accompanying an enlarged scale or complexity of an entire installation nor leading to a bad working environment or reduced productivity.

In this respect, according to another aspect of the present invention, the cutting includes having a cut chip leaving a groove part of an arbitrary first undulation in a preset direction, breaking a ridge part of the arbitrary first undulation to form therein a subset of the set of second undulations.

Furthermore, according to another aspect of the present invention, the cutting includes feeding a cutting tool in an axial direction of the cylindrical surface, rotating the cutting tool to cut the set of first undulations in the cylindrical surface, having the ridge parts broken and formed with the set of second undulations.

Still more, according to another aspect of the present invention, the cutting includes cutting a groove part of an arbitrary first undulation, uncutting a top portion of a ridge part of an associated first undulation, and having a cut chip leaving the groove part, tearing off and carrying together the top portion of the ridge part, having a subset of the set of second undulations formed in a remainder of the ridge part.

Yet more, according to another aspect of the present invention, the cutting includes cutting a groove part and one side of a ridge part of an arbitrary first undulation, uncutting a top portion of the ridge part to have a cut chip integral with the top portion, making the cut chip leave the groove part, tearing off the top portion from a remainder of the ridge part, having a subset of the set of second undulations formed in the remainder.

BRIEF DESCRIPTION OF DRAWINGS

The above and further objects and novel features of the present invention will more fully appear from the following detailed description when the same is read in conjunction with the accompanying drawings, in which.

BEST MODE FOR CARRYING OUT THE INVENTION

Figure 1:
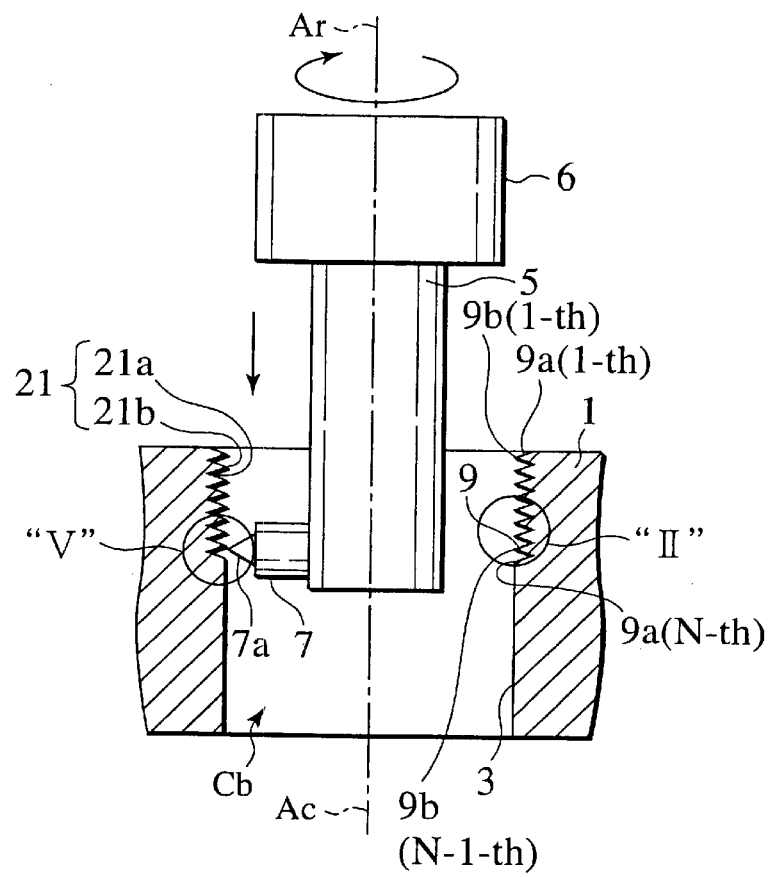
FIG. 1 is a schematic sectional view of an essential portion of a cylinder block having a cylinder inside thereof being processed by a cutting tool in a prespray processing method according to an embodiment of the invention.

There will be detailed below the preferred embodiments of the present invention with reference to the accompanying drawings. Like members are designated by like reference characters.

FIG. 1 shows in section an essential portion of a cylinder block 1 made of aluminum for use to a liner-less type engine for automobiles. The cylinder block 1 has a number of cylinder bores Cb. In each cylinder bore Cb, its cylinder inside 3 is processed by a cutting tool 7 in a prespray processing method according to an embodiment of the invention. The cylinder inside 3 is configured as a cylindrical surface to be prepared for a spray (11, FIG. 3) film to be formed thereon.

In this prespray preparation, the cylinder inside 3 is cut to be roughed by the cutting tool 7 (as a threading bite in this case) laterally attached at right angles to a lower end of a balling bar 5 coaxially chucked to an axially feedable spindle head 6 of a multi-head NC (numerically controlled) machine tool.

As the spindle head 6 as well as the balling bar 5 is rotated about a rotation axis Ar thereof aligned to a center axis Ca of the cylinder inside 3 and concurrently axially fed (downward in FIG. 1) by a preset feed pitch, the cutting tool 7 also is rotated about the center axis Ca and concurrently axially fed by the same feed pitch, cutting the cylinder inside 3 by a cutting edge 7a thereof (as a cutting tip of the threading bite), thus making a roughed surface 9 in a threaded form, that is, in the form of a cut number of screws of a rough undulation 21 with a groove 21a and a ridge 21b, or as an axial array or column of spirally extending rough undulations 21.

Figure 2:
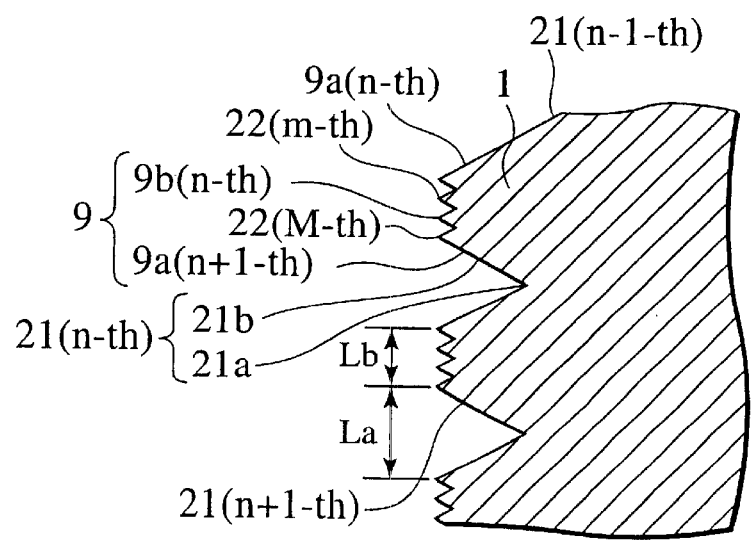
FIG. 2 is a detail "II" of FIG. 1 showing a roughed cylinder inside of the cylinder block.

FIG. 2 is an enlarged sectional view of part "II" of FIG. 1, where the roughed surface 9, which is cut in a threaded form directly by the tool 7, has: a total number of N (where N is an NC controlled integer) screws of a groove shape cut surface 9a (as the combination of a later-described groove 21a and opposing sides of later-described ridges 21b); and a total number of N−1 screws of a broken surface 9b (of the ridge 21b) of which an n-th (n is an arbitrary integer under N) screw spirally extends between n-th and n+1-th screws of groove shape cut surface 9a.

The n-th screw of broken surface 9b is formed by breaking or tearing a medium height of a ridge shape remaining wall part (for example, 9e, FIG. 10) of the cylinder inside 3 between the n-th and n+1-th screws of groove shape cut surface 9a, making use of cut chips (for example, 20, FIG. 10) leaving the n+1-th screw of groove shape cut surface 9a, so that the broken surface 9b is formed with resultant fine undulations (for example, 22, FIG. 9), whereby it is allowed in a subsequent spraying process for a spray film (for example, 11, FIG. 3) to have an enhanced adhesion strength to the roughed surface 9.

The roughed surface 9 is apparently undulated with a total number of N rough undulations 21 of which an n-th one 21 is defined by a connected combination of: an n+1-th screw of groove shape cut surface 9a, excepting the last widthwise quarter thereof that constitutes an n+1-th rough undulation 21; an n-th screw of broken surface 9b; and the last widthwise quarter of an n-th screw of groove shape cut surface 9a of which the remaining three widthwise quarters constitute an n−1-th rough undulation 21. A connected combination of the second and third widthwise quarters of the n+1-th screw of groove shape cut surface 9a constitutes a groove part 21a of the n-th rough undulation 21, and a connected combination of the first quarter of the n+1-th screw of groove shape cut surface 9a, the n-th screw of broken surface 9b, and the last widthwise quarter of the n-th screw of groove shape cut surface 9a constitutes a ridge part 21b of the n-th rough undulation 21.

A respective screw of broken surface 9b also is undulated with a total number of M (M is a resultant integer) fine undulations 22 of which an m-th (m is an arbitrary integer under M) one 22 is finer in width than an associated rough undulation 21.

Accordingly, the cylinder inside 3 is prepared for a spray film (11) to be formed thereon and roughed with a set of N rough undulations 21 cut therein in a threaded form, including a subset (whole set in this case) thereof having ridge parts 21b of rough undulations 21 thereof broken and formed with a set of M fine undulations 22 finer in undulation width than an associated rough undulation 21.

It is noted that, letting La be a width of screw of cut surface 9 and Lb be a width of screw of broken surface 9b, as shown in FIG. 2, the proportion that a total area of broken surface 9b occupies in a total area of roughed surface 9 can be expressed as a broken surface percentage H, such that H={Lb/(La+Lb)}×100 (%). As used herein, the area is defined in terms of a radial projection on the cylindrical surface (3).

Figure 9:
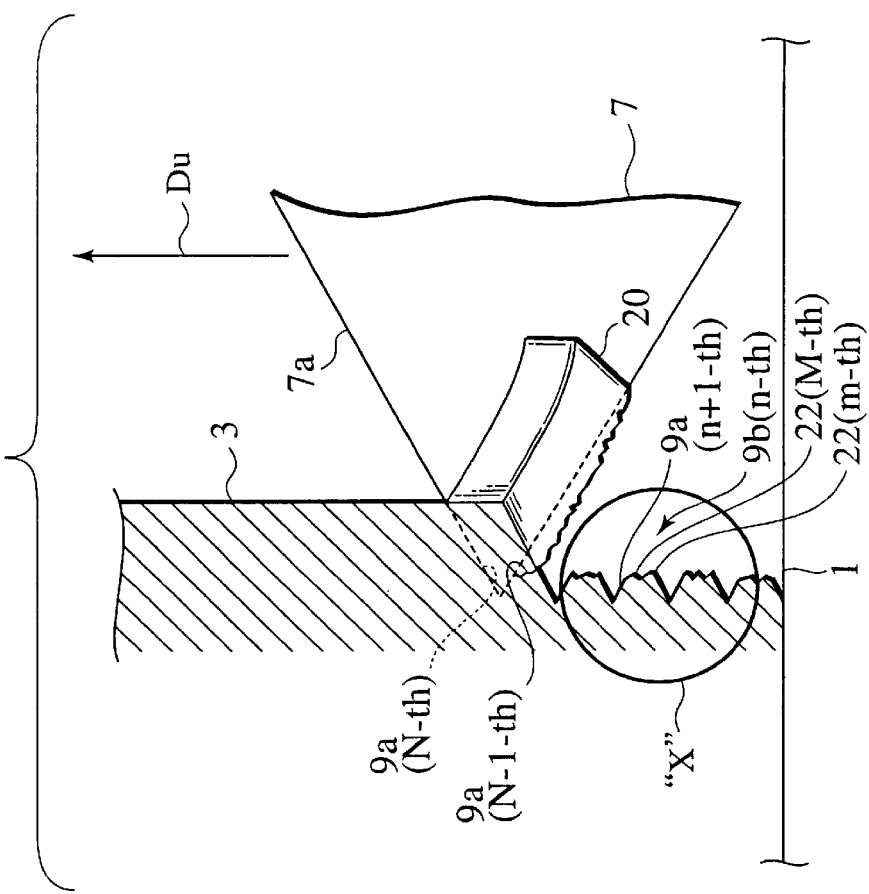
FIG. 9 is an illustration describing the principle of a surface roughing by way of a groove cutting accompanying a braking of ridge part by cut chips in accordance with the invention.
Figure 10:
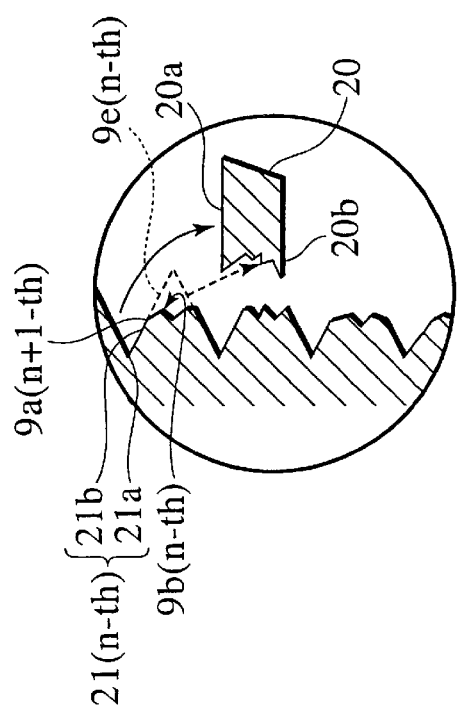
FIG. 10 is a detail "X" of FIG. 9, illustrating a ridge part broken by an associated cut chip.

Description is now made of how to break a medium height of the ridge shape remaining wall part, with reference to FIG. 9 and FIG. 10, where the cutting tool 7 of which the cutting edge 7a has a triangular form is fed in an upward direction Du by an overlapping pitch, for example.

In FIG. 9, as the cutting tool 7 being rotated is fed upward, the cylinder inside 3 is spirally cut, so that there is continuously made an N-th screw of groove shape cut surface 9a, which partially overlaps an N-1-th screw of groove shape cut surface 9a in the axial direction, having a cut chip 20 leaving the N-th screw of groove shape cut surface 9a.

As best shown for an n-th rough undulation 21 in FIG. 10, the cut chip 20 has a substantially trapezoidal main part 20a cut off as a partially uncut counter part of the N-th screw of groove shape cut surface 9a (including a groove part 21a of the n-th rough undulation 21), leaving therefrom in a controlled direction, and a substantially triangular subsidiary part 20b torn off from a ridge part 21b of the n-th rough undulation to leave together with the main part 20a, so that the ridge part 21b is broken and thereby roughed at the top with M fine undulations 22. The configuration and size of the chip 20, as well as of rough undulations 21 with ridge part 21b inclusive, can be controlled by setting associated processing parameters, such as a tool feeding speed (threading pitch P, FIG. 5), a cutting depth (D, FIG. 5), a cutting angle, a rake angle, etc. It is noted that the broken surface 9b corresponds, in radial coordinate, to a cut-end position of the main part 20a or an uncut-start position of the subsidiary part 20b.

Figure 3:
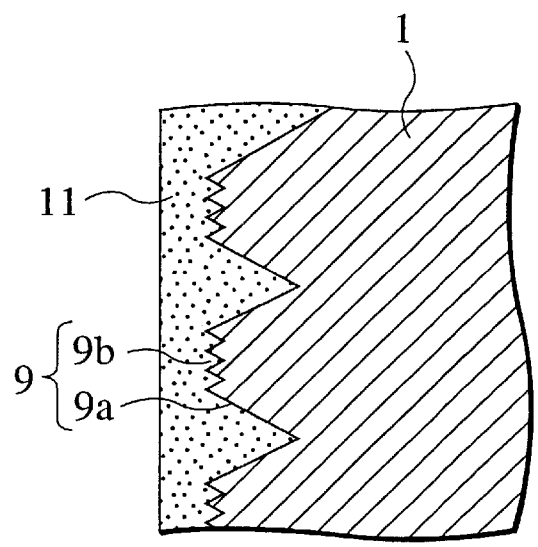
FIG. 3 is a sectional view of a spray film formed on the cylinder inside of FIG. 2.

FIG. 3 shows a spray film 11 formed on the roughed surface 9. The spray film 11 intrudes into respective recesses of cut surface 9a and broken surface 9b, and has a great adhesion strength. In particular, on the broken surface 9b which is broken or torn by chips (20) and has fine undulations and active tissue, the spray film 11 has a significantly enhanced adhesion strength.

Figure 4:
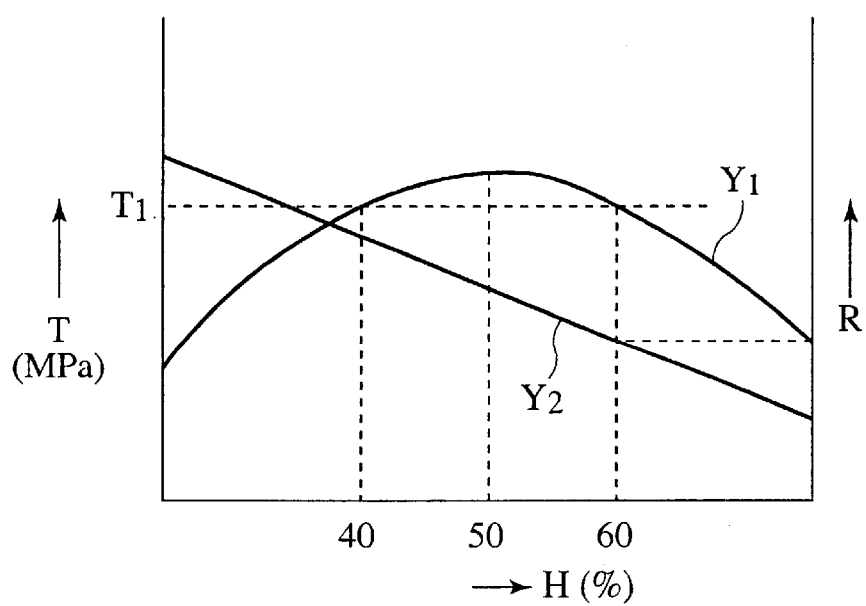
FIG. 4 is a graph showing a cut surface roughness and a spray film adhesion strength relative to a broken surface proportion.

FIG. 4 is a graph showing an adhesion strength T of the spray film 11 and a surface roughness R of the cut surface 9a relative to the broken surface percentage H. A curve Y1 represents an adhesion strength T (Mpa) of the spray film 11 to a varied broken surface percentage H (%), and a straight line Y2 represents a surface roughness R of the cut surface 9a to a varied broken surface percentage H (%). With respect to a broken surface percentage H=50% as a boundary, in a left region where the broken surface percentage H is under 50%, the adhesion strength T increases as the broken surface percentage H increases, but in a right region where the broken surface percentage H is over 50%, the adhesion strength T decreases as the broken surface percentage H increases. This is because in the left region an increased broken surface percentage H gives an increase in adhesion strength T, but in the right region such a decrease in surface roughness R as shown by Y2 causes a decrease in adhesion strength T, so that a resultant collective adhesion strength T is reduced. The surface roughness R of the cut surface 9a may preferably be set within a range of Rz 50 μm to 150 μm.

To obtain a stable adhesion strength T1 that the spray film 11 should have as a reference to the roughed surface 9, some conditions of the balling processing needs to be set as described below, so that the broken surface percentage ranges 40% to 60%.

Figure 5:
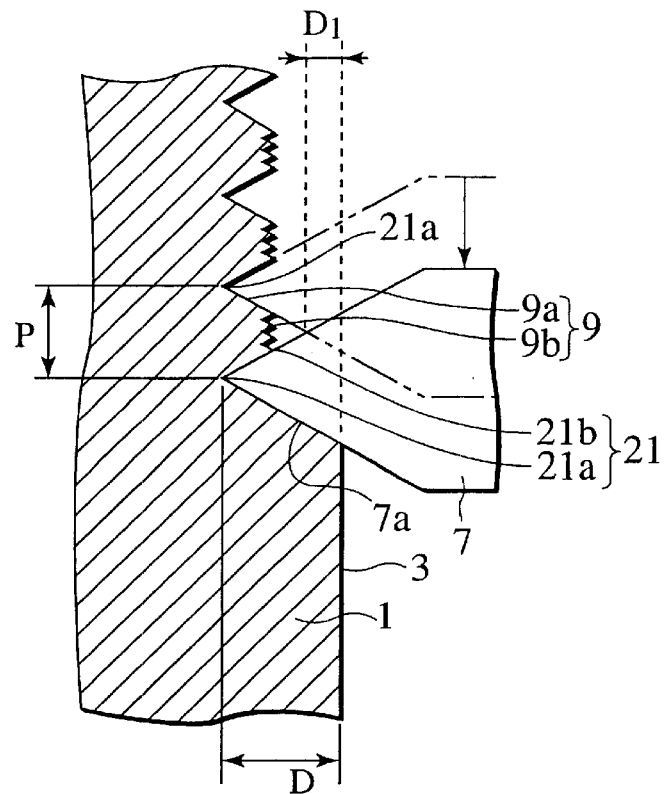
FIG. 5 is a detail "V" of FIG. 1 showing the cylinder inside being cut by the cutting tool, describing a feed pitch and a cutting depth of the tool.

FIG. 5 is a detail of part "V" of FIG. 1, where a cutting depth D of tool 7 is defined as a distance from the cylinder inside 3 to a deepest point of the groove part 21a of a rough undulation 21 to be processed. As a balling processing condition, the feed pitch of tool 7 is set so that a thread pitch P between neighboring groove parts 21a resides under 0.3 mm, and the cutting depth D of tool 7 is set under 1.0 mm.

An overlap depth D1 of the tool 7 may for example be set within 20% to 75% of the cutting depth D, whereby the main part 20a of a respective cut chip 20 produced in formation of the cut surface 9a (or rough undulation 21) act on the remaining cylinder surface wall part (as ridge part 21b), to break or tear off a top part thereof (as the subsidiary part 20b of the cut chip 20) to be removed together with the main part 20a, thereby forming a broken surface 9b, so that the roughed surface 9 has a broken surface percentage within a range of 40% to 60%.

Figure 6A:
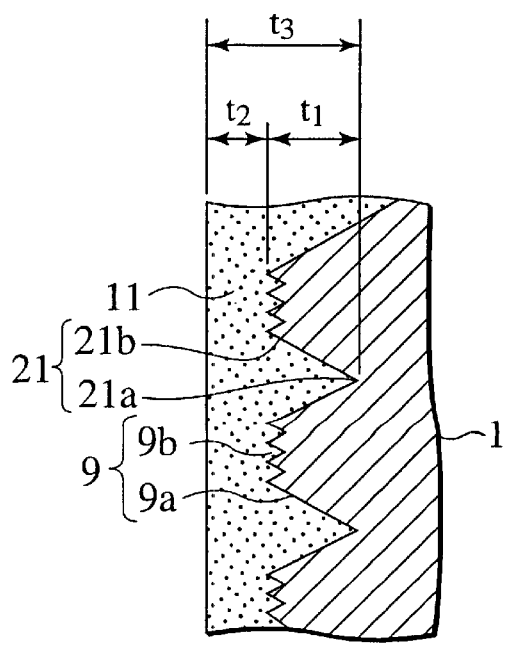
FIG. 6A is a sectional view of a spray film formed on a surface roughed by a maximal cutting depth.

FIG. 6A shows a spray film 11 formed on the cylindrical inside 3, as it has been roughed by the tool 7 selected to be relatively great in cutting depth D. The spray film 11 has a value t3 of total thickness Th equivalent to a sum of: a cut surface height t1, which is a height of a ridge part 21b relative to the bottom of a groove part 21b of an associated rough undulation 21 and equals to a distance between the top of a raised part of the broken surface 9b and the deepest point of a recessed part of the cut surface 9a; and a surface film thickness t2, which is a thickness of a spray film part above the ridge part 21b and equals to a distance between a surface of the spray film 11 and a top of the raised part of the broken surface 9b.

Figure 6B:
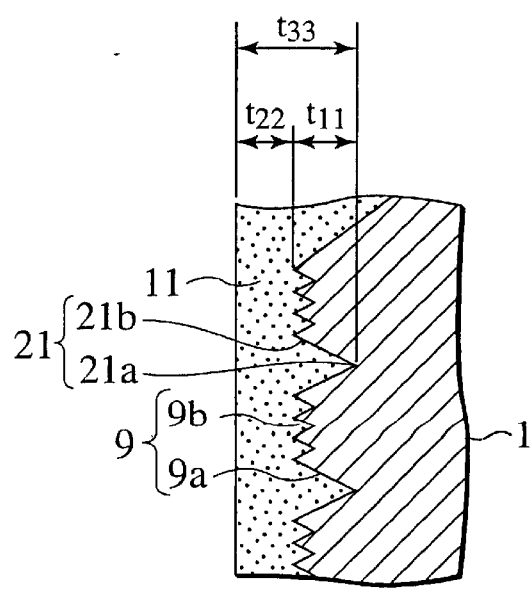
FIG. 6B is a sectional view of a spray film formed on a surface roughed by a minimal cutting depth.

FIG. 6B shows a spray film 11 formed on the cylinder surface 3, as it has been roughed by the tool 7 selected to be relatively small in cutting depth D. This spray film 11 also has a value t3 of total thickness Th equivalent to a sum of a cut surface height t11 and a surface film thickness t22.

The spray film 11 should be thick enough to have a secured reliability. It is observed that the total film thickness t3 for great cutting depth D has such a relationship to the total film thickness t33 for small cutting depth D that t3>t33.

Figure 7:
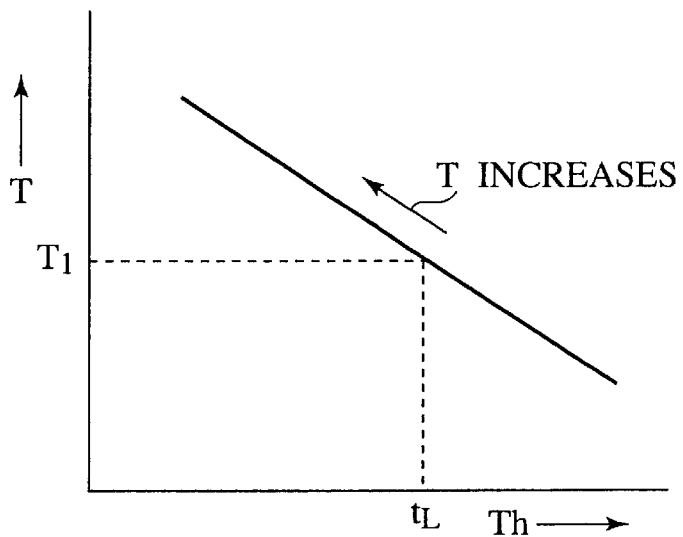
FIG. 7 is a graph showing a spray film adhesion strength to a film thickness.

FIG. 7 shows a relationship between the adhesion strength T and the total film thickness Th (such as t3, t33) of the spray film 11. The adhesion strength T may be expressed in terms of a shearing strength. As shown in FIG. 7, the adhesion strength T increases as the film thickness Th decreases, and this thickness Th should be under a reference value tL for the reference adhesion strength T1 to be secured.

Figure 8:
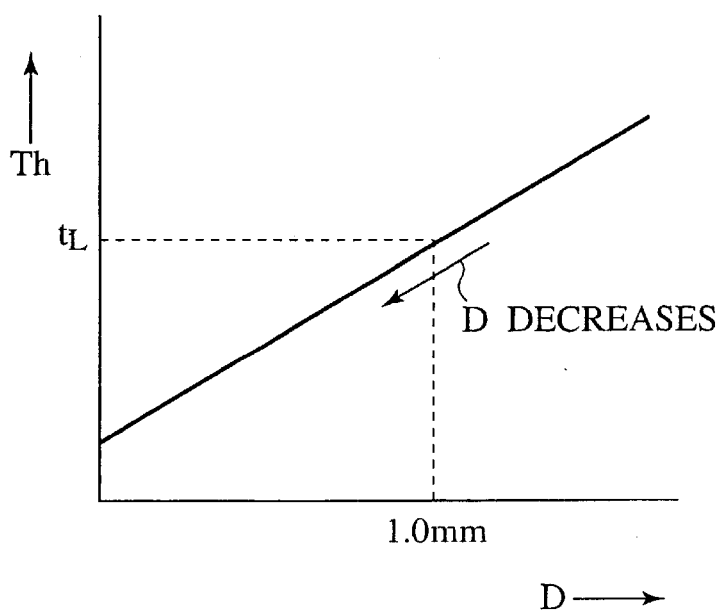
FIG. 8 is a graph showing a spray film thickness to a cutting depth.

FIG. 8 shows a relationship between the total film thickness Th and the cutting depth D of the tool 7. As shown in FIG. 8, the film thickness Th decreases as the cutting depth D decreases, and this depth D should be under 1.0 mm to have a smaller film thickness Th than the reference value tL for the reference adhesion strength T1 to be secured.

Accordingly, the tool 7 in use is selected to have a suppressed cutting depth D that provides a lowered cut surface height (such as t1 or t11), whereby the total film thickness Th (such as t3 or t33) is set small, allowing for the spray film 11 to have an enhanced adhesion strength and improved reliability, resulting in a saved quantity of abrasive material and a reduced production cost.

For a preparation to form a spray film 11, the cylinder inside 3 is roughed by a balling process using a cutting tool 7, without employing a blasting process, thus successfully avoiding accompanying an enlarged scale or complexity of an entire installation nor leading to a bad working environment or reduced productivity.

In the embodiment, the present invention is described of application to a roughing of a cylinder inside 3 of an aluminum cylinder block 1 for automobile engines. It however is not limited to this application, but is applicable to a cylinder inside to be prepared for a spray process.

The contents of Japanese Patent Application No. 2000-350056 are incorporated herein by reference.

While preferred embodiments of the present invention have been described using specific terms, such description is for illustrative purposes, and it is to be understood that changes and variations may be made without departing from the scope of the following claims.

INDUSTRIAL APPLICABILITY

According to the present invention, a cylinder inside can be roughed without employing a blasting process, thus successfully avoiding accompanying an enlarged scale or complexity of an entire installation nor leading to a bad working environment or reduced productivity.

What is claimed is:
1. A prespray processed cylinder inside comprising a cylindrical surface (3) prepared for a spray film (11) to be formed thereon and roughed with a set of first undulations (21) cut therein in a threaded form, including a subset thereof having ridge parts (21b) of first undulations (21) thereof broken and formed with a set of second undulations (22) finer in undulation width than a first undulation (21).

2. A prespray processed cylinder inside according to claim 1, wherein a total area of the cylindrical surface (3) roughed with the set of second undulations (22) occupies a proportion (H) within 40% to 60% of a total area of the cylindrical surface (3) roughed with the set of first undulations (21).

3. A cylinder inside prespray processing method comprising preparing a cylindrical surface (3) for a spray film (11) to be formed thereon, roughing the cylindrical surface (3) by cutting therein a set of first undulations (21) in a threaded form, having ridge parts (21b) of first undulations (21) of a subset thereof broken and formed with a set of second undulations (22) finer in undulation width than a first undulation (21).

4. A cylinder inside prespray processing method according to claim 3, wherein the cutting includes having a cut chip (20) leaving a groove part (21a) of an arbitrary first undulation (21) in a preset direction, breaking a ridge part (21b) of the arbitrary first undulation (21) to form therein a subset of the set of second undulations (22).

5. A cylinder inside prespray processing method according to claim 3, wherein the cutting includes feeding a cutting tool (7) in an axial direction (Du) of the cylindrical surface (3), rotating the cutting tool (7) to cut the set of first undulations (21) in the cylindrical surface (3), having the ridge parts (21b) broken and formed with the set of second undulations (22).

6. A cylinder inside prespray processing method according to claim 5, further comprising controlling the cutting tool (7) to have a feed pitch (P) for the undulation width of the set of first undulations (21) to be under 0.3 mm, a cutting depth (D) to be under 1.0 mm from the cylindrical surface (3), and an overlap depth (D1) to be within 20% to 75% of the cutting depth (D).

7. A cylinder inside prespray processing method according to claim 3, wherein the cutting includes cutting a groove part (21a) of an arbitrary first undulation (21), uncutting a top portion (9e) of a ridge part (21b) of an associated first undulation (21), and having a cut chip (20) leaving the groove part (21a), tearing off and carrying together the top portion (9e) of the ridge part (21b), having a subset of the set of second undulations (22) formed in a remainder of the ridge part (21b).

8. A cylinder inside prespray processing method according to claim 3, wherein the cutting includes cutting a groove part (21a) and one side of a ridge part (21b) of an arbitrary first undulation (21), uncutting a top portion (9e) of the ridge part (21b) to have a cut chip (20) integral with the top portion (9e), making the cut chip (20) leave the groove part (21a), tearing off the top portion (9e) from a remainder of the ridge part (21b), having a subset of the set of second undulations (22) formed in the remainder.

* * * * *